United States Patent [19]

Bennett

[11] 4,047,826

[45] Sept. 13, 1977

[54] DRILL HAVING INDEXABLE REPLACEABLE INSERT TIP

[76] Inventor: John T. Bennett, 137 Ridgewood Circle, Downingtown, Pa. 19335

[21] Appl. No.: 686,935

[22] Filed: May 17, 1976

[51] Int. Cl.² .................................................. B23B 27/10
[52] U.S. Cl. ....................................... 408/59; 408/199; 407/11; 407/103; 407/113
[58] Field of Search ......................... 408/199, 226–229, 408/231, 233, 239, 144, 59, 713, 186, 197; 29/105 A, 105 R

[56] References Cited

U.S. PATENT DOCUMENTS

| 2,237,901 | 4/1941 | Chun | 29/103 A |
|---|---|---|---|
| 2,360,385 | 10/1944 | Anderson | 408/59 |
| 2,575,239 | 11/1951 | Stephens | 175/383 |
| 2,590,053 | 3/1952 | Taylor | 29/96 X |
| 2,971,409 | 2/1961 | Peters et al. | 408/59 |
| 3,076,357 | 2/1963 | Benjamin et al. | 408/211 |
| 3,250,154 | 5/1966 | Breuning | 408/199 |
| 3,293,727 | 12/1966 | Simms | 279/20 |
| 3,364,800 | 1/1968 | Benjamin et al. | 408/239 |
| 3,540,325 | 11/1970 | Artaud | 408/187 |
| 3,577,168 | 5/1971 | Cashman | 29/96 |
| 3,646,650 | 3/1972 | Milewski | 29/105 A |
| 3,827,119 | 8/1974 | Bennett | 29/105 R |
| 3,878,905 | 4/1975 | Schaumann | 175/383 |

*Primary Examiner*—Leonidas Vlachos
*Attorney, Agent, or Firm*—Woodcock, Washburn, Kurtz & Mackiewicz

[57] ABSTRACT

A drill comprising a shank and an elongate body with an axial slot near one end thereof. A generally hexagonal insert of sintered tungsten carbide or high speed steel is placed in the slot and received in a V-shaped seat formed in the bottom of the slot. A cross-screw extends through a hole in the insert and serves to clamp the slot closed upon opposite sides of the insert. In a preferred embodiment a passage extends axially through the drill body, and the insert seats in a separable anvil which is located by means of a tang registering in the axial passage.

5 Claims, 7 Drawing Figures

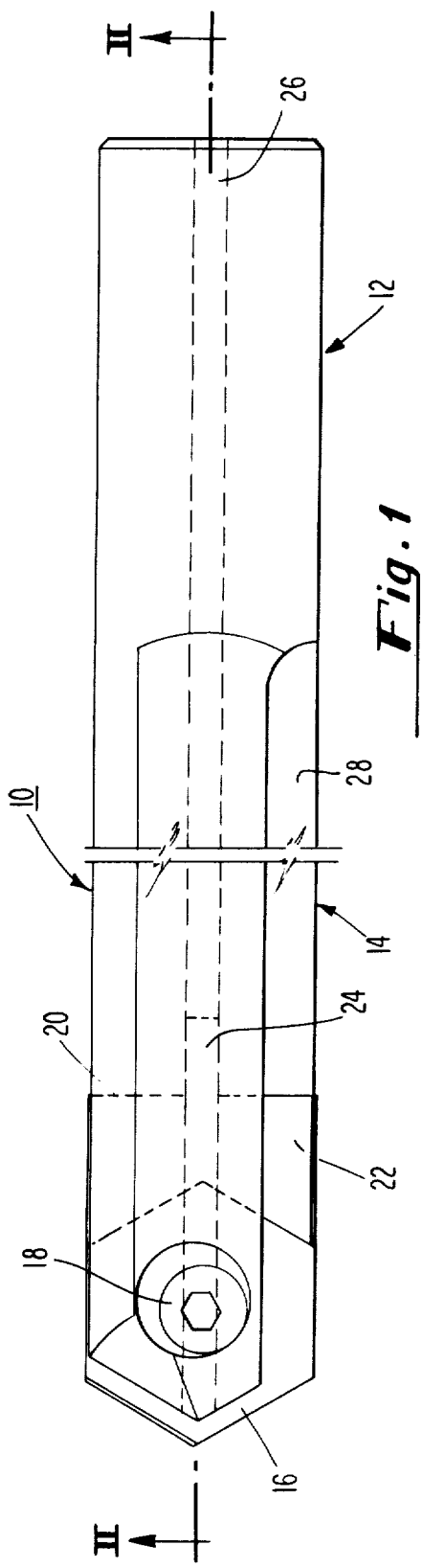
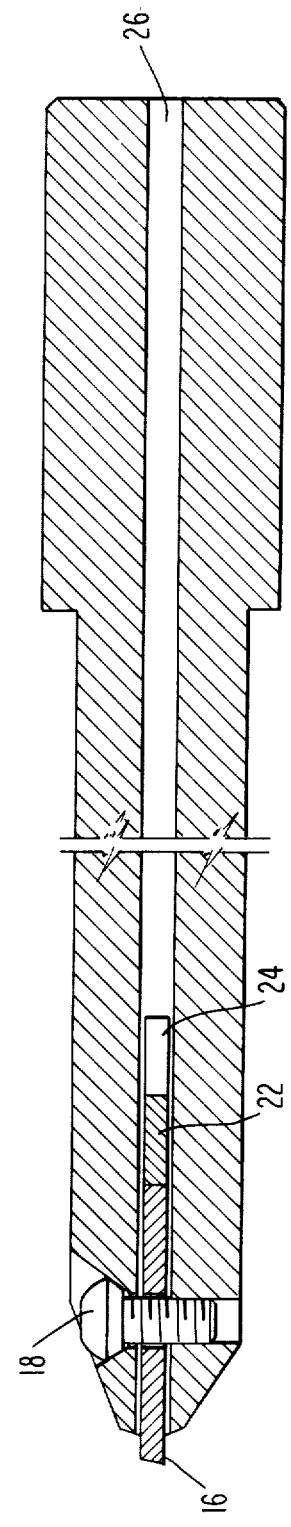
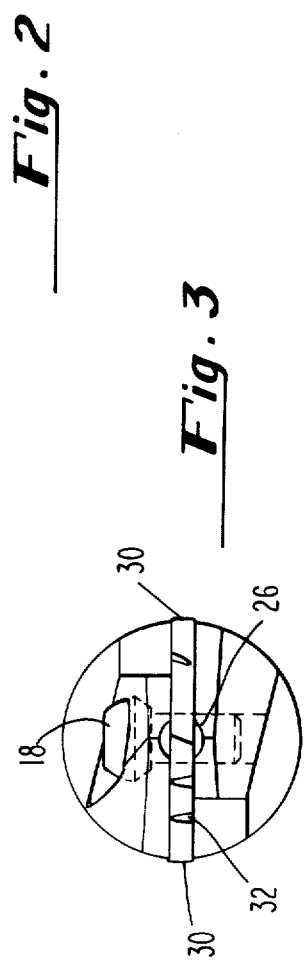

DRILL HAVING INDEXABLE REPLACEABLE INSERT TIP

BACKGROUND OF THE INVENTION

The present invention relates to drills, and more particularly to a drill which includes a disposable and/or indexable insert blade forming the tip thereof.

Disposable inserts have been known in the machine tool field for many years, and enjoy considerable popularity due to their relatively low cost and further due to the fact that they allow cutter edges to be replaced quickly and easily without the need for removing or sharpening an entire tool.

The design of tool holders for replaceable inserts calls for a considerable degree of expertise since it is necessary for the inserts to be held securely, yet be easily removable. Further, particularly in the case of inserts formed from sintered tungsten carbide, a substantially rigid support and a seat must be provided the insert so that it will not tend to flex and crack in use. The problems of design are compounded when an indexable, i.e., symmetrical, insert is to be used since this places additional constraints upon the size and shape of the insert. Accordingly, considerable effort has been expended in the design of holders for replaceable inserts.

Most cutting tools designed to date for use with disposable and/or indexable inserts have been relatively massive, thereby affording the strength and rigidity necessary to support an insert and maintain its location. For instance, U.S. Pat. Nos. 3,646,650-Milewski and 3,293,727-Simms relate to cutting tools which are relatively massive and which accept replaceable inserts. While the holders disclosed in the foregoing patents are meritorious, they do not lend themselves to the relatively slender, elongate configuration necessary for a drill. Further, none of the prior art designs is adaptable for use as a drill having disposable, indexable tips. Accordingly, it will be seen that it would be advantageous to provide a drill including an easily releasable, securely supported indexable tip.

It is therefore an object of the present invention to provide a drill having a disposable tip member.

Another object is to provide a drill having a readily indexable tip.

It is another object of the present invention to provide an inexpensively manufactured drill body which securely receives an indexable tip and conducts coolant to the working surfaces thereof.

Another object of the invention is to provide an indexable insert for use in drilling operations.

Yet another object is to provide an improved indexable insert which may be readily located in a drill body.

SUMMARY OF THE INVENTION

Briefly stated, in accordance with one aspect of the invention the foregoing objects are achieved by providing an elongate, generally cylindrical body member having an axially-extending transverse slot near one end thereof. Fastening means such as a screw extends through the body and across the slot for drawing the sides of the slot toward one another, and seating means are provided so that the slot terminates in a V-shaped recess. A replaceable insert is disposed in the slot, the fastening means extending through an aperture in the center of the insert. A first pair of edges of the insert extend outwardly of the slot to form a drill point, while an opposing pair of edges seat in the V-shaped recess. The remaining, lateral edges of the insert are formed to allow clearance within the hole being drilled.

In a preferred embodiment, the drill body has a passage extending axially therethrough, the passage being larger in diameter than the width of the slot so that a pair of opposed recesses extend along the slot, on either side of the insert. Coolant may thus be forced through the tool body directly to the point of the drill. The V-shaped recess in the slot may be formed by a separable anvil having a tang which locates in the passage.

The insert can be provided with shallow grooves across the faces thereof to allow coolant to flow directly to the cutting lips of the insert. The lateral edges of the insert may be cylindrical, or may be relieved to lessen frictional engagement with the walls of a hole being drilled.

BRIEF DESCRIPTION OF THE DRAWING

While the specification concludes with claims particularly pointing out and distinctly claiming the subject matter which is regarded as the invention, it is believed that the invention will be better understood from the following description of a preferred embodiment taken in conjunction with the accompanying drawing in which:

FIG. 1 is a plan view of a drill embodying features of the present invention;

FIG. 2 is a sectional view taken along II — II of FIG. 1;

FIG. 3 is an end view of the drill of FIG. 1; and

DESCRIPTION OF A PREFERRED EMBODIMENT

Figure 4A:
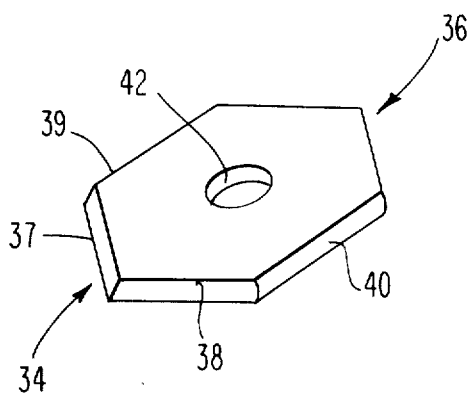
FIGS. 4a -4d are trimetric views of indexable inserts for use in the drill assembly of FIGS. 1 - 3.

FIG. 1 shows a top or plan view of a preferred embodiment of the inventive drill. The drill advantageously comprises a unitary body generally designated 10, including a shank 12 and an end portion 14. The end portion of the body is provided with a transverse slot within which a cutting insert 16 is disposed. Insert 16 is symmetrical in form, here being depicted as a hexagon. An aperture in the center of the insert allows a fastening means such as a threaded screw 18 to pass from one side of the body to the other for drawing the body together against the insert, holding it tightly in place.

The bottom of the slot terminates along a straight line 20, and an anvil 22 is disposed in the bottom of the slot. The edge of the anvil opposite the bottom of the slot forms a V-shaped recess for snugly receiving the end of insert 16 which is not in use. A tang 24 extends from the otherwise-straight edge of anvil 22 into an axial passage 26 to locate the anvil transversely in the drill body. As will be described hereinafter, the passage 26 extends throughout the length of the drill. A flat land 28, which is generally coplanar with the aligned surfaces of insert 16 and anvil 22, extends axially along the body portion of the drill to allow the egress of chips.

Turning now to FIG. 2 a sectioned side view of the drill is seen, the location of the axial passage 26 being clearly visible. The diameter of the passage 26 is advantageously larger than the width of the slot in which insert 16 and anvil 22 are captured so that a recess is formed on either side of the slot. The recesses allow coolant introduced into passage 26 to be carried along both faces of the insert and to the tip thereof. By extending the end portion of the drill body on either side of the insert, close to the tip which forms the point of the drill, coolant can readily be conveyed directly to the site of metal removal.

For present purposes the term "coolant" will be considered to encompass any appropriate fluids including air, lubricating oil, water, emulsions, etc. which may be used for cooling or lubricating the drill tip and/or for encouraging the removal of chips. Chip removal may be factilitated, particularly in deep holes, by the provision of a pair of opposed lands one of which is visible in FIG. 1. The surface of the land is advantageously coplanar with the upper surfaces of insert 16 and anvil 22, as shown in FIG. 2. While the surface of the land may be somewhat lower than the surfaces of the insert or anvil, it should not be higher since the resulting step will impede the flow of chips.

The use of a separate anvil 22 allows the transverse slot to be machined in the body of the drill in a straightforward manner since the bottom of the slot may then be flat, extending transversely across the drill. The anvil essentially serves to convert the flat bottom of the slot to a V-shaped recess for snugly receiving one end of insert 16. Further, through the use of a separable anvil the V-shaped surfaces thereof may easily be machined at angles which match the lip reliefs at the ends of the insert, providing a uniform engagement of the lip surfaces and less pressure upon the sharpened edges thereof. Alternatively, it may be desired to provide the V-shaped edge of the anvil with convex surfaces so that they achieve line contact with the lips of the insert.

The width of tang 24 of the anvil is substantially the same as the diameter of axial passage 26. This affords lateral location of the anvil, and keeps it from moving transversely in the body of the drill. In order to provide good registration of the tang in the passage the edges of the tang may be ground to match the radius of the passage. By making the thickness of the anvil approximately the same as that of insert 16 the anvil will be clamped in place by the action of screw 18. The thickness of tang 24, i.e., the dimension transverse to its width, may be the same as the rest of the anvil and considerably less than the diameter of passage 26. As is apparent from FIG. 2, coolant may then flow over the tang, past the anvil and over the planar surfaces of the insert 16 to the tip thereof.

FIG. 3 shows an end view of the preferred embodiment, showing the recesses formed in opposing faces of the slot by passage 26. It will be noted that the shank of screw 18 passes directly across the passage in order to engage opposing sides of the body. It has been found that by selecting an appropriate diameter for passage 26 the presence of screw 18 does not unduly restrict the flow of coolant to the point of the drill.

From an inspection of FIG. 3 it will further be seen that the lateral edges 30 of the insert 16 are radiused so that they will rub but not cut into the walls of the hole being drilled. The radiused lateral edges provide a line contact which minimizes friction while locating the drill in the hole. If desired, the width of the insert may be such as to provide clearance within the hole. Grooves 32 may be formed in the cutting edges of the insert so as to split the chip which is cut by the insert, thus encouraging chip breakage and removal. The use of such grooves in an insert is shown and discussed in U.S. Pat. No. 3,791,001 issued to the present inventor.

The lateral edges of anvil 22 may also be configured to minimize frictional contact with the walls of a hole being drilled. In one alternative embodiment the width of the anvil may be the same as the width of the cutting lips of insert 16 so that the lateral edges of the anvil serve as wear pads, contacting the walls of the hole being drilled and serving to stabilize the drill within the hole. In this manner a removable wear pad is provided which can be replaced when worn or to accommodate inserts of different sizes.

FIGS. 4a – 4d show alternate embodiments of inserts for use with the drill assembly of FIGS. 1 – 3. FIG. 4a shows an indexable insert having a generally hexagonal configuration produced by a pair of opposed ends 34, 36 each of which forms a working point for a drill. Each end is defined by a pair of angularly displaced cutting edges 37, 38 which meet at an included angle which defines the point angle of the drill. Further, the cutting edges are each disposed at some angle with respect to one of the planar faces of the insert, which defines the lip relief angle of the drill. As is familiar to those skilled in the art the forwardmost corners of each edge, as defined by the lip relief angle, comprise the cutting lips of the drill point.

Lateral edges 39, 40 of the insert extend between the opposed ends 34 and 36 thereof and are formed so as to provide non-interfering clearance with the walls of the hole formed by the cutting lips of either end of the insert. In the embodiment shown in FIG. 4a the lateral edges are radiused or "crowned" to provide a generally cylindrical configuration. In this manner any contact which occurs with the wall of a hole will be along a line and will be frictional in nature, the corners of the lateral edges not digging in or cutting the hole walls.

Finally, an aperture 42 is centrally located in the insert to allow the fastener screw which is used to draw opposed sides of the insert-receiving slot together to pass through the insert. Since the insert is located in a first direction by the walls of the slot, and in another perpendicular direction by the V-shaped recess, aperture 42 can be substantially larger than the diameter of the clamping screw.

Figure 4B:
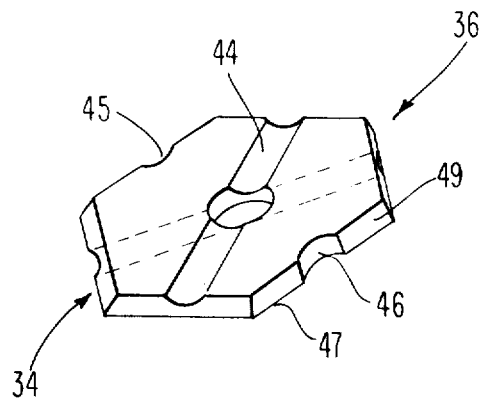

Turning now to FIG. 4b another embodiment of an indexable insert is shown wherein a groove 44 is formed across one face of the insert. The groove extends from the cutting lip of one edge of end 34 to a corresponding area on the opposite end 36. In a preferred embodiment a similar groove is provided across the opposite face of the insert (not visible in the Figure). Groove 44, as it traverses the central portion of the insert, communicates with the axial passage of the drill body and thus allows coolant to be directed to the cutting lip of the drill while it is in operation. Further, the presence of the groove produces a discontinuity in the cutting lips which serves to separate the chips produced by the drill. While groove 44 is shown as a single straight groove in some applications it may be preferable to provide several such grooves, or to offset the lengths of grooves lying at opposite sides of the central aperture. Offsetting the grooves in this manner, when it is done on both sides of the insert, will separate the chips cut by the cutting edges in an asymmetrical manner. This further enhances chip breakage and removal. With an insert of the type shown in FIG. 4b it may not be necessary to continue axial passage 26 to the extreme tip of the body of the drill, although this may be a desirable feature for some applications.

Another aspect of the embodiment to FIG. 4b is the presence of reliefs 45, 46 in the lateral edges of the insert. The reliefs comprise generally concave areas formed in each of the lateral edges, which effectively reduce the area which contacts the wall of a hole being drilled. The remaining lengths of the lateral edges may be radiused as in FIG. 4a or may be relieved, substantially as shown at 47. The rake of the lateral edge nearest the cutting lip allows the lip to cut to its fullest extent, while the portions 49 of the lateral edge further back and adjacent the edges of the opposite end of the insert, exhibit a reverse rake which rides over the wall of the hole without digging in.

Figure 4C:
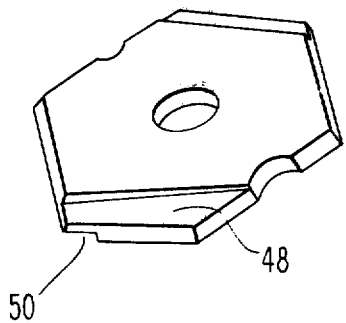

FIG. 4c shows still another embodiment wherein a groove is provided along each cutting lip at both ends of the insert. The grooves illustrated at 48, 50 act in a manner familiar to those skilled in the art to encourage the breakage of chips. Further, the grooves cross one another near the point of the drill end so as to thin the web of the drill at its center, further enhancing its action.

Figure 4D:
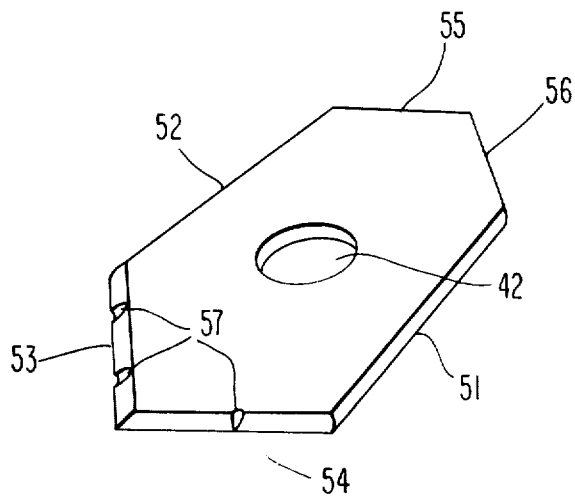

FIG. 4d is another embodiment of a disposable tip for the drill of FIG. 1, wherein the lateral edges 51, 52 of the insert taper backwardly from cutting edges 53, 54. As before, an aperture 42 is located approximately in the center of the insert to allow the passage therethrough of a clamping screw or the like. The back end of the insert comprises surfaces 55 and 56, which are configured to seat snugly within the anvil 22, thus providing a rigid base for the insert. Inasmuch as the lateral edges of the insert taper back they clear the sides of the hole being formed, and moreover provide additional clearance for the egress of chips and/or coolant. In order further to reduce friction the edges may be crowned as shown.

The forward cutting edges are advantageously provided with chip splitting grooves 57. The configuration of such grooves 57 is more fully disclosed in U.S. Pat. No. 3,791,001 issued on Feb. 12, 1974 to the present inventor. Grooves 57 need not be of any particular configuration, serving principally to interrupt the cutting edge in order to divide the chip formed by the edge, making it easier to break. Such grooves produce admirable results when used in conjunction with chip breakers of various sorts. The grooves are asymmetrically placed as shown so that the cutting lips of the drill point produce chips of different widths. This also aids in the breakage and removal of chip material.

As will be evident from the foregoing description, certain aspects of the invention are not limited to the particular details of the examples illustrated, and it is therefore contemplated that other modifications or applications will occur to those skilled in the art. It is accordingly intended that the appended claims shall cover all such modifications and applications as do not depart from the true spirit and scope of the invention.

What is claimed as new and desired to be secured by Letters Patent of the United States is:

1. A drill for forming holes in metal with a high degree of precision, comprising:
    a shank portion and an elongate, cylindrical body portion, having a passage extending axially therethrough, said body portion further having an axial slot in one end thereof, said slot having a bottom surface which extends perpendicularly to the axis of the body;
    a threaded screw extending across said slot and across the longitudinal axis of the body for drawing the sides of the slot together;
    a replaceable insert disposed in said slot and being indexable about said fastening means, said insert having a pair of parallel planar opposed faces, a pair of opposed ends, at least one of said ends having two angularly displaced cutting lips each lying at a lip relief angle to one of said faces, said insert further having a pair of opposed side edges extending between said opposed ends, said side edges being configured to provide non-interfering clearance with the walls of a hole formed by said cutting lips;
    said passage having a diameter greater than the thickness of the insert and extending into said slot for conducting coolant along both sides of the insert to at least the center thereof; and
    seating means comprising a separable, planar anvil having lateral edges and a first, substantially straight edge adapted to seat in the bottom of said slot; a locating tang projecting from said straight edge for engaging said axial passage, and a generally V-shaped indented edge opposite said flat edge forming a recess for receiving one of said opposed ends of said insert, the lateral edges of said anvil protruding from either side of said drill body to substantially equal the width of said insert to comprise wear pads for stabilizing the drill.

2. A drill according to claim 1, wherein as least one face of said insert is provided with a groove extending from the center thereof to at least one of said cutting lips for conducting a flow of coolant to said cutting lips.

3. A precision metal drill having an indexable insert forming the cutting tip thereof, comprising:
    an elongate body having a shank at one end and at the other end thereof an axially-extending slot terminating in a substantially flat bottom oriented transversely to the drill body;
    fastening means engaging the portions of said body lying on either side of said slot for drawing said portions toward one another;
    a passage extending generally axially through the length of said drill body, said passage having a diameter greater than the width of said slot;
    seating means disposed in the bottom of said slot and comprising a generally planar member having:
        a first, substantially straight edge seating in the bottom of a slot;
        a pair of lateral edges extending generally perpendicularly to said first edge;
        a locating tang extending from said edge and engaging said axial passage; and
        a V-shaped edge opposite said straight edge for snugly receiving thereagainst two of the edges of the insert; and
    a generally hexagonal indexable insert disposed in said slot, and having two opposed pairs of cutting edges, two of said cutting edges seating in said V-shaped recess, said insert having a generally centrally-located aperture for allowing the passage of said fastening means therethrough; said insert including at least one groove formed in the surface thereof and extending from said aperture to one of the cutting edges for conducting coolant to said edge.

4. A drill according to claim 3, wherein said lateral edges extend outwardly from said slot and are spaced by a width substantially equal to the width of said insert, whereby said lateral edges encounter the inner surface of a hole being drilled by said insert.

5. A drill according to claim 4, wherein said lateral edges are cylindrical in form.

* * * * *